United States Patent
Kim (10) Patent No.: US 9,710,084 B2
(45) Date of Patent: Jul. 18, 2017

(54) ORGANIC LIGHT-EMITTING DIODE (OLED) DISPLAY

(71) Applicant: Samsung Display Co., Ltd., Yongin, Gyeonggi-Do (KR)

(72) Inventor: Tae Sik Kim, Seoul (KR)

(73) Assignee: Samsung Display Co., Ltd., Gyeonggi-Do (KR)

(*) Notice: Subject to any disclaimer, the term of this patent is extended or adjusted under 35 U.S.C. 154(b) by 96 days.

(21) Appl. No.: 14/449,454

(22) Filed: Aug. 1, 2014

(65) Prior Publication Data

US 2015/0185960 A1    Jul. 2, 2015

(30) Foreign Application Priority Data

Dec. 31, 2013 (KR) .................. 10-2013-0169362

(51) Int. Cl.
*G06F 3/041* (2006.01)
*G06F 3/044* (2006.01)
*G09G 3/3233* (2016.01)

(52) U.S. Cl.
CPC .......... *G06F 3/0412* (2013.01); *G06F 3/044* (2013.01); *G06F 3/0416* (2013.01); *G06F 2203/04111* (2013.01); *G09G 3/3233* (2013.01)

(58) Field of Classification Search
CPC ...... G06F 3/0412; G06F 3/0416; G06F 3/044; G06F 2203/04111; G09G 3/3233
See application file for complete search history.

(56) References Cited

U.S. PATENT DOCUMENTS

| | | | |
|---|---|---|---|
| 8,139,037 B2 | 3/2012 | Furuhashi et al. | |
| 8,780,580 B2 * | 7/2014 | Oohira | G02F 1/13452 361/749 |
| 2009/0122026 A1 | 5/2009 | Oh | |
| 2010/0110041 A1 * | 5/2010 | Jang | G06F 3/0412 345/174 |
| 2011/0242023 A1 | 10/2011 | Lee | |
| 2012/0050195 A1 | 3/2012 | Heo et al. | |
| 2013/0086508 A1 | 4/2013 | Oguz | |
| 2014/0178618 A1 * | 6/2014 | Tanabe | B32B 3/02 428/38 |
| 2015/0286395 A1 * | 10/2015 | Yamada | G09G 5/00 345/173 |

FOREIGN PATENT DOCUMENTS

KR    10-1004405 B1    12/2010
KR    10-2013-0003742 A    1/2013

* cited by examiner

*Primary Examiner* — Nelson Rosario
(74) *Attorney, Agent, or Firm* — Knobbe Martens Olson & Bear LLP (57) ABSTRACT

An organic light-emitting diode (OLED) display is disclosed. In one aspect, the OLED display includes a display substrate including a display area and a peripheral area surrounding the display area, a thin film display layer formed in the display area, and a touch sensor formed in the peripheral area on the display substrate. The OLED display further includes an encapsulation substrate formed over the thin film display layer, a touch sensing layer formed over the encapsulation substrate, and a window formed over the touch sensing layer.

18 Claims, 10 Drawing Sheets

ORGANIC LIGHT-EMITTING DIODE (OLED) DISPLAY

CROSS-REFERENCE TO RELATED APPLICATIONS

This application claims priority to and the benefit of Korean Patent Application No. 10-2013-0169362 filed in the Korean Intellectual Property Office on Dec. 31, 2013, the entire contents of which are incorporated herein by reference.

BACKGROUND

Field

The described technology generally relates to an organic light-emitting diode (OLED) display.

Description of the Related Technology

Flat panel displays, such as organic light-emitting diode (OLED) displays, liquid crystal displays (LCDs), and electrophoretic displays (EPDs), include a field generating electrode and an electro-optical active layer. For example, OLED displays include an organic emission layer as an electro-optical active layer and the EPDs include charged particles. The field generating electrode is connected to a switching element such as a thin film transistor (TFT) to receive a data signal and the electro-optical active layer converts the data signal to an optical signal to display an image.

Recently, many such displays have included a touch sensing function in which interaction with a user can be performed, in addition to the base functionality of displaying images. The touch sensing function is used to generate touch information such as whether an object touches a screen and the touch location thereof by sensing a change in pressure, charge, light, or the like applied to the screen of the display when a user touches a finger or a touch pen to the screen. The display can receive an image signal based on the touch information. In addition, the display can include a window protecting the display. The window is a separate layer typically bonded to the display by an adhesive such as resin.

The above information disclosed in this Background section is only intended to facilitate the understanding of the background of the described technology and therefore it may contain information that does not constitute the prior art that is already known in this country to a person of ordinary skill in the art.

SUMMARY OF CERTAIN INVENTIVE ASPECTS

One inventive aspect is an OLED display including a touch sensing layer.

Another aspect is an OLED display including a touch sensing layer and a substantially uniformly cured resin layer.

Another aspect is an OLED display including a display substrate including a display area and a peripheral area surrounding the display area, a thin film display layer formed in the display area on the display substrate, a touch sensor formed in the peripheral area on the display substrate, an encapsulation substrate formed on the thin film display layer, a touch sensing layer formed on the encapsulation substrate, and a window formed on the touch sensing layer.

The OLED display may further include a display flexible printed circuit board electrically connected to the thin film display layer and attached to the display substrate and a touch flexible printed circuit board electrically connected to the touch sensing layer and attached to the encapsulation layer.

The display flexible printed circuit board may include a touch pad electrically connected to the touch sensor.

The touch pad may be configured to apply a touch input signal to the touch sensor or receive a touch output signal from the touch sensor.

The OLED display may further include a touch sensor pattern interposed between the touch sensor and the display substrate.

The displaying flexible printed circuit board may include a touch connection portion electrically connected to the touch sensor pattern.

The touch connection portion may be configured to apply a touch input signal to the touch sensor via the touch sensor pattern or receive a touch output signal from the touch sensor via the touch sensor pattern.

The display flexible printed circuit board and the touch flexible printed circuit board may be arranged on the same side of the display substrate.

The display flexible printed circuit board and the touch flexible printed circuit board may be arranged on opposing sides of the display substrate.

The thin film display layer may include a plurality of pixels and each pixel may include an OLED.

The OLED display may further include a display driver formed in the peripheral area and configured to apply driving signals to the pixels and a touch driver formed over the touch flexible printed circuit board and configured to receive a sense output signal from the touch sensing layer.

The OLED display may further include a resin layer formed between the touch sensing layer and the window.

The touch sensor may include a light source.

The light source may be a light emitting diode (LED).

Another aspect is an OLED display including a display substrate including a display area and a peripheral area surrounding the display area, a thin film display layer formed in the display area, a touch sensor formed in the peripheral area on the display substrate, an encapsulation substrate formed over the thin film display layer, a touch sensing layer formed over the encapsulation substrate, and a window formed over the touch sensing layer.

The OLED display can further include a display flexible printed circuit board electrically connected to the thin film display layer and attached to the display substrate and a touch flexible printed circuit board electrically connected to the touch sensing layer and attached to the encapsulation layer. The display flexible printed circuit board can include a touch pad electrically connected to the touch sensor. The touch pad can be configured to apply a touch input signal to the touch sensor or receive a touch output signal from the touch sensor. The OLED display can further include a touch sensor pattern interposed between the touch sensor and the display substrate. The display flexible printed circuit board can include a touch connection portion electrically connected to the touch sensor pattern. The touch connection portion can be configured to apply a touch input signal to the touch sensor via the touch sensor pattern or receive a touch output signal from the touch sensor via the touch sensor pattern. The display flexible printed circuit board and the touch flexible printed circuit board can be arranged on the same side of the display substrate. The display flexible printed circuit board and the touch flexible printed circuit board can be arranged on opposing sides of the display substrate. The thin film display layer can include a plurality of pixels and each pixel can include an OLED. The OLED display can further include a display driver formed in the peripheral area and configured to apply driving signals to the pixels and a touch driver formed over the touch flexible printed circuit board and configured to receive a sense output signal from the touch sensing layer. The OLED display can further include a resin layer interposed between the touch sensing layer and the window. The touch sensor can include a light source. The light source can be a light emitting diode (LED).

Another aspect is an OLED display including a substrate including a display area and a peripheral area surrounding the display area, a touch sensor formed in the peripheral area and configured to sense a touch input, and a transparent layer formed over the touch sensor, wherein a gap is formed between the transparent layer and the touch sensor.

The OLED display can further include a thin film display layer formed in the display area, a touch sensing layer formed over the thin film display layer, a touch flexible printed circuit board electrically connected to the touch sensing layer, and a display flexible printed circuit board electrically connected to the thin film display layer and the touch sensor. The display flexible printed circuit board can include an input unit and is configured to transmit display signals received from the input unit to the thin film display layer and touch input signals received from the input unit to the touch sensor. The touch flexible printed circuit board can be electrically connected to the display flexible printed circuit board and can be configured to transmit sense input signals received from the display flexible printed circuit board to the touch sensing layer. The touch and display flexible printed circuit boards can be spaced apart from the transparent layer. The OLED display can include a touch sensor pattern interposed between the touch sensor and the display substrate.

According to at least one embodiment, an irradiation path for ultraviolet light is formed for the irradiation of light onto a resin layer by forming the touch sensor not on the window but on the display substrate, thereby enabling the substantially uniform curing of the resin layer.

In addition, a separate flexible printed circuit board for the touch sensor is not required and thus the number of components of the OLED display can be reduced.

DETAILED DESCRIPTION OF CERTAIN INVENTIVE EMBODIMENTS

The described technology will be described more fully hereinafter with reference to the accompanying drawings, in which exemplary embodiments are shown. As those skilled in the art would realize, the described embodiments may be modified in various different ways, all without departing from the spirit or scope of the described technology. On the contrary, exemplary embodiments introduced herein are provided to make the disclosed contents thorough and complete and sufficiently transfer the spirit of the described technology to those skilled in the art.

In the drawings, the thicknesses of layers, films, panels, regions, etc., may be exaggerated for the sake of clarity. It will be understood that when a layer is referred to as being "on" another layer or substrate, it can be directly on the other layer or substrate or intervening elements may also be present. Like reference numerals designate like elements throughout the specification. The term "substantially" as used in this disclosure means completely, almost completely, or to any significant degree.

An organic light-emitting diode (OLED) display according to an exemplary embodiment will be described with reference to FIG. 1 to FIG. 10.

Figure 1:
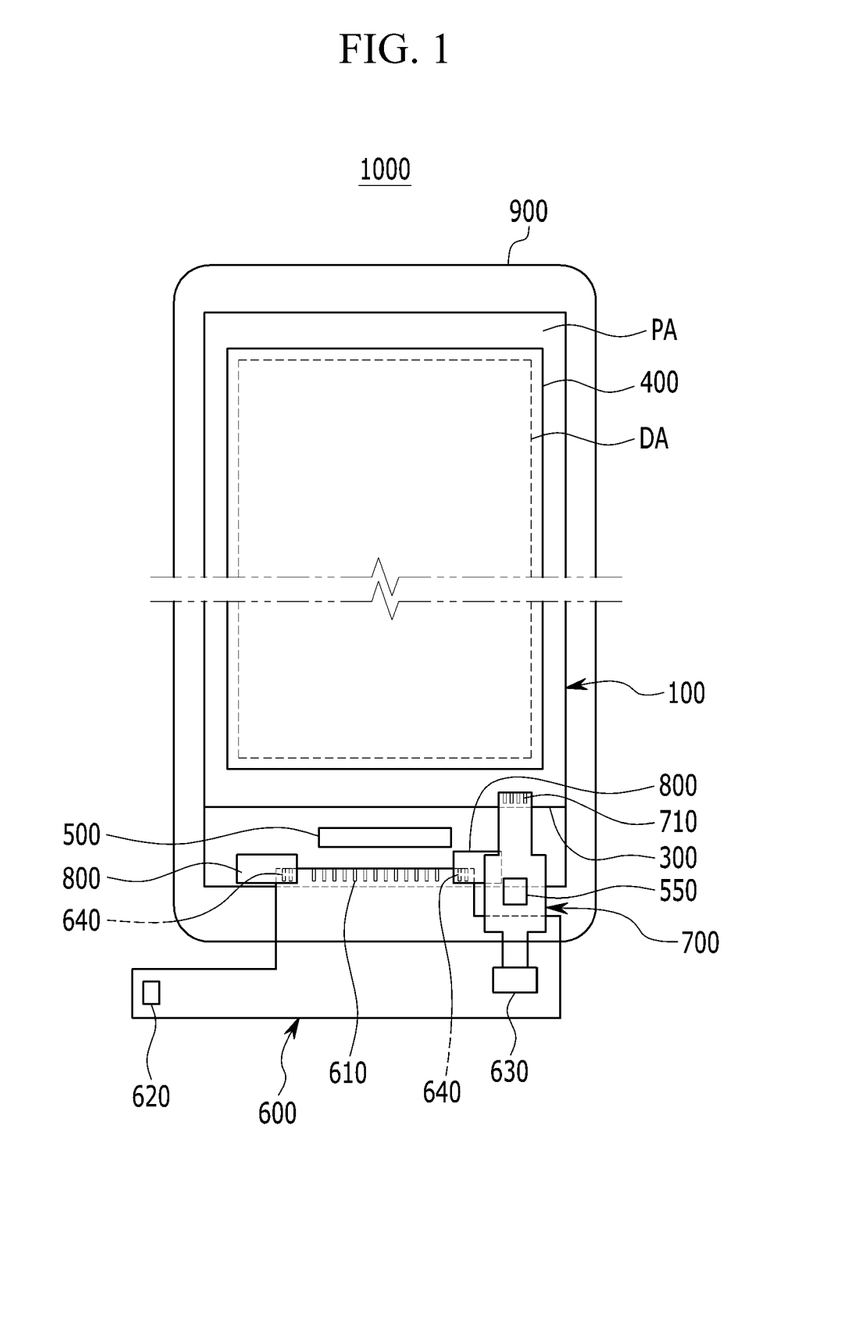
FIG. 1 is a top plan view schematically illustrating an OLED display according to an exemplary embodiment.
Figure 2:
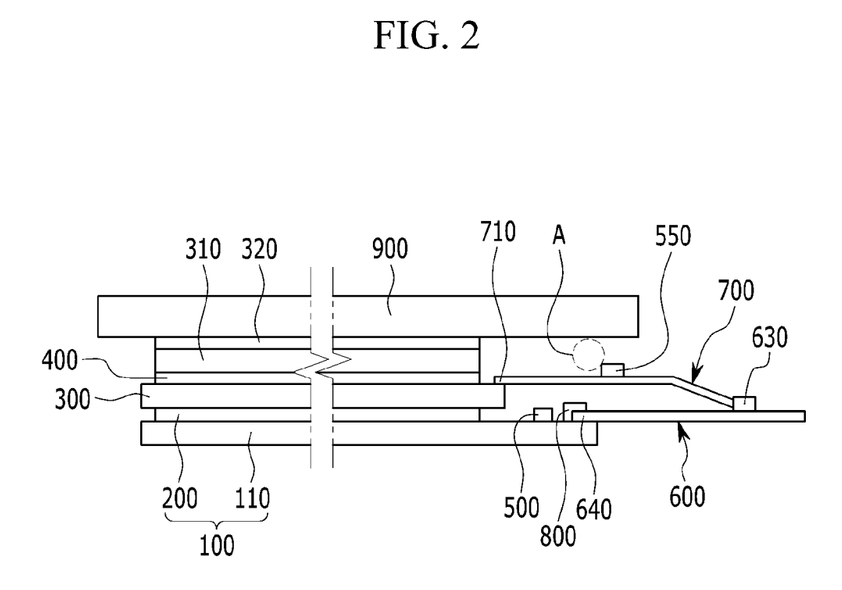
FIG. 2 is a side view schematically illustrating a side surface of the OLED display of FIG. 1.

FIG. 1 and FIG. 2 illustrate the structure of the OLED display before a flexible printed circuit board (FPCB) is bent and then attached to a bottom surface of a display substrate.

The OLED display 1000 includes a display panel 100, an encapsulation substrate 300, a touch sensing layer 400, a polarization layer 310, a resin layer 320, and a window or transparent layer 900.

In addition, the OLED display 1000 includes a display flexible printed circuit board 600 attached to the display panel 100 and a touch flexible printed circuit board 700 attached to the encapsulation substrate 300.

The OLED display 1000 includes a display area DA where images are displayed and a peripheral area PA surrounding the display area DA in a top plane view.

The display panel 100 includes a display substrate 110 formed of an electrically insulating material such as transparent glass or plastic and a thin film display layer 200 formed on the display substrate 110. The display substrate 110 may have rounded corners to prevent breakage. In addition, a cushion layer may be attached to the bottom surface of the display substrate 110 to protect the OLED display 1000 from external impacts.

The thin film display layer 200 includes a plurality of pixels and each pixel includes a switching thin film transistor Qs, a driving thin film transistor Qd, a storage capacitor Cst, and an OLED LD. The thin film display layer 200 is formed in the display area DA.

The display panel 100 includes a display driver 500 for applying a driving signal to each pixel of the thin film display layer 200. The display driver 500 is formed in the peripheral area PA on the display substrate 110.

In addition, the display panel 100 includes a touch sensor 800. The touch sensor 800 is formed in the peripheral area PA on the display substrate 110 and senses touch input from a user. The touch sensor 800 can prompt a change in the images display on the screen in the display area DA. For example, when a user touches the touch sensor 800, the displayed screen shown in the display area DA can be changed to another screen. In addition, the touch sensor 800 includes a light source such as a light emitting diode (LED).

The encapsulation substrate 300 is formed on the thin film display layer 200 and is bonded to the display substrate 110 by a sealant (not shown).

The touch sensing layer 400 is formed on the encapsulation substrate 300 to sense touch input. The touch sensing layer 400 can sense touch input when an object approaches or touches the touch sensing layer 400. As used herein, touch input refers not only to when an external object such as a user's finger directly touches the touch sensing layer 400 or window 900 but also to when the external object approaches the touch sensing layer 400 or window 900 or hovers over the touch sensing layer 400 or window 900.

The polarization layer 310, the resin layer 320, and the window 900 are sequentially formed on the touch sensing layer 400.

The polarization layer 310 can increase the contrast ratio of the OLED display 1000 by reducing the reflection of external light. The resin layer 320 is an adhesive layer for attaching the window 900 to the polarization layer 310. The resin layer 320 is cured via irradiation of ultraviolet light. The window 900 also protects the display panel 100 and the touch sensing layer 400.

The display flexible printed circuit board 600 includes a display terminal 610, an input section or input unit 620, a first connection portion 630, and a touch pad 640.

The display terminal 610 is attached to the display substrate 110 and thus electrically connects the display flexible printed circuit board 600 to the display driver 500. The input section 620 receives an external signal and the first connection portion 630 electrically connects the touch flexible printed circuit board 700 to the display flexible printed circuit board 600.

The touch pad 640 is electrically connected to the touch sensor 800 to transmit an external touch input signal to the touch sensor 800 and/or transmit a touch output signal from the touch sensor 800 to an external device.

In addition, various circuit elements may be formed on the display flexible printed circuit board 600. The display flexible printed circuit board 600 receives an external signal through the input section 620 and applies the received signal to the display driver 500.

The touch flexible printed circuit board 700 is attached to the encapsulation substrate 300 and includes a touch terminal 710 that electrically connects the touch flexible printed circuit board 700 to the touch sensing layer 400. The touch flexible printed circuit board 700 is electrically connected to the display flexible printed circuit board 600 through the first connection portion 630 and receives an external signal via the input section 620 and the first connection portion 630.

The touch driver 550 is mounted to the touch flexible printed circuit board 700. The touch driver 550 receives a sense input signal for the touch sensing layer 400 from an external source and then transmits the received signal to the touch sensing layer 400. In addition, the touch driver 550 receives a sense output signal from the touch sensing layer 400 and then processes the signal.

The display flexible printed circuit board 600 and the touch flexible printed circuit board 700 are respectively attached to the display substrate 110 and the encapsulation substrate 300 on the same side of the OLED display 1000 in the embodiment of FIG. 1, but this is not restrictive. The display and touch flexible printed circuit boards 600 and 700 can be connected on opposing sides of the OLED display 1000.

The display and touch flexible printed circuit boards 600 and 700 are bent around an edge of the display substrate 110 and are thus attached to the bottom surface of the display substrate 110.

As previously described, the window 900 is attached to the polarization layer 310 via the resin layer 320. The resin layer 320 is cured by irradiating ultraviolet light onto the resin layer 320 and the resin layer 320 can be substantially uniformly cured when the irradiation is sufficiently uniformly irradiated such that the window 900 can be firmly attached.

In the standard OLED display, the touch sensor 800 including a light source is formed on the bottom surface of the window 900 and thus blocks ultraviolet light irradiated onto the resin layer 320, thereby causing non-uniform curing of the resin layer 320. However, according to at least one embodiment, the touch sensor 800 including the light source is formed in the peripheral area PA on the display substrate 110 so that an area A is available as an irradiation path such that the ultraviolet light can be substantially uniformly irradiated. Accordingly, the resin layer 320 can be substantially uniformly cured and the window 900 can be firmly attached.

In addition, since the touch sensor 800 is formed on the display substrate 110 and is electrically connected to the touch pad 640 of the display flexible printed circuit board 600, an additional flexible printed circuit board for the touch sensor 800 is not required. Accordingly, the design of the OLED display 1000 is simplified.

In addition, the touch sensor 800 is not formed on the window 900 and thus the size of the window 900 can be reduced compared to the standard OLED display.

Hereinafter, an OLED display according to another exemplary embodiment will be described with reference to FIG. 3 and FIG. 4.

Figure 3:
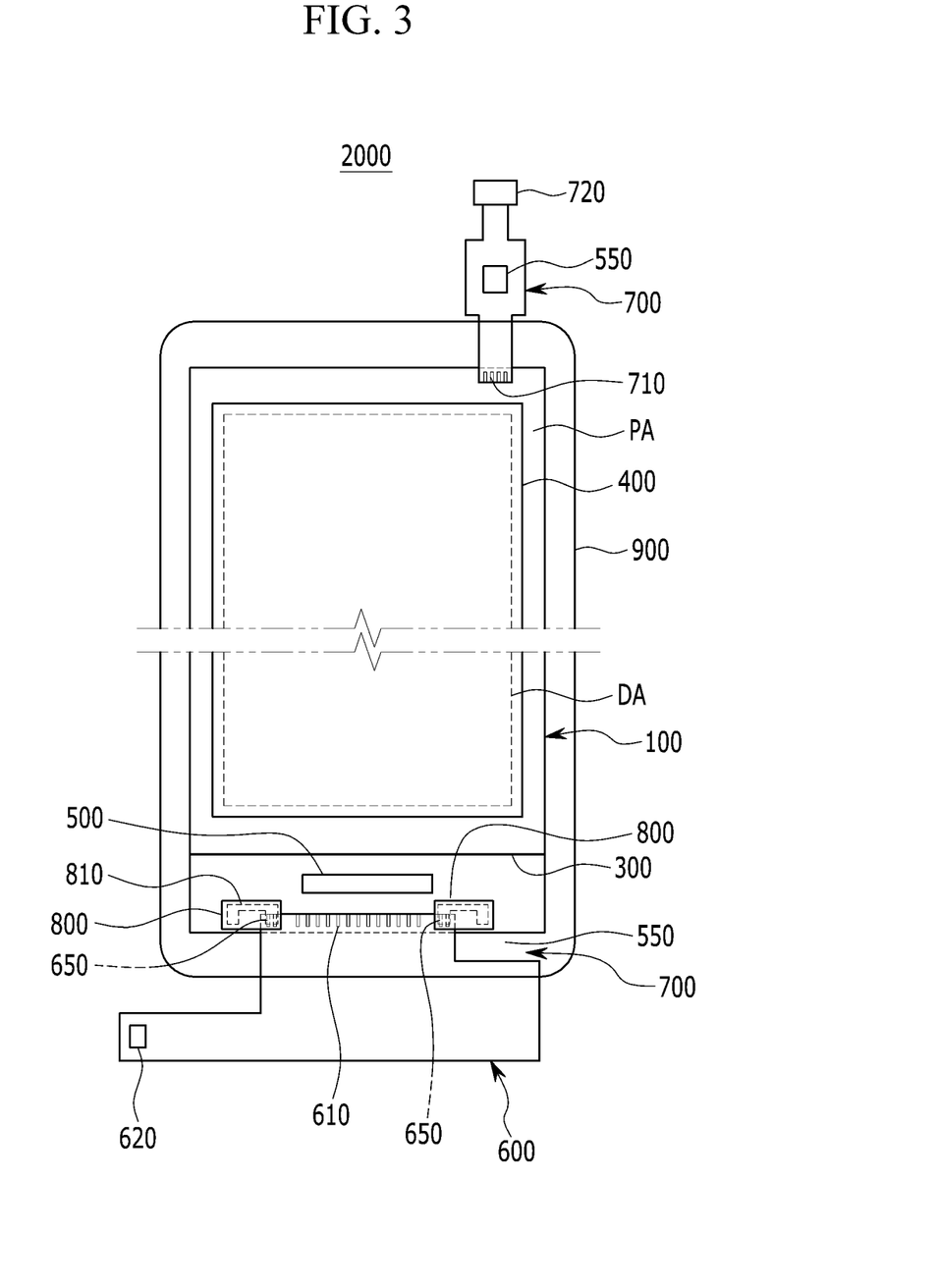
FIG. 3 is a top plan view schematically illustrating an OLED display according to another exemplary embodiment.
Figure 4:
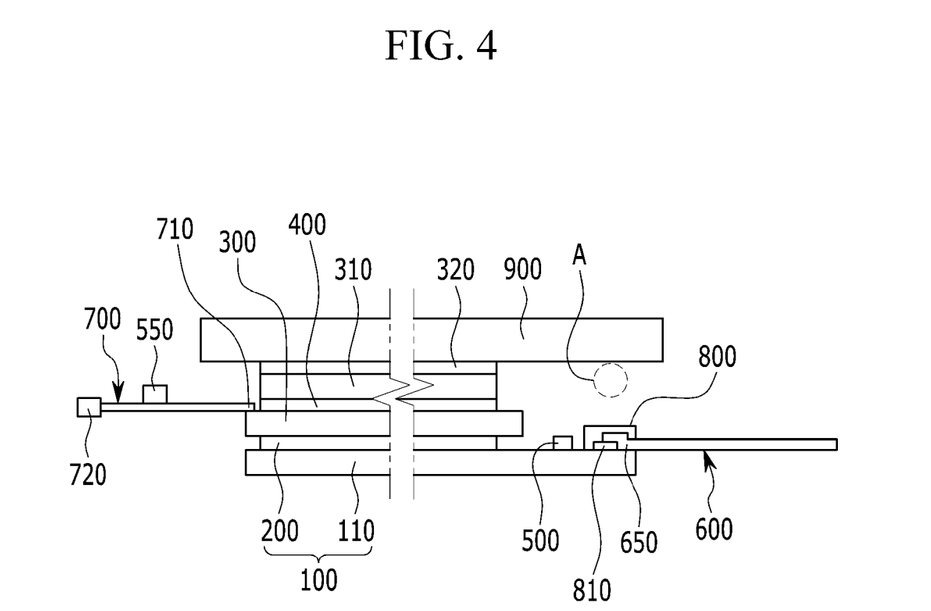
FIG. 4 is a side view schematically illustrating a side surface of the OLED display of FIG. 3.

Referring to FIG. 3 and FIG. 4, the structure of the OLED display before a flexible printed circuit board (FPCB) is bent and attached to a bottom surface of a display substrate is illustrated.

The OLED display 2000 includes a display panel 100, an encapsulation substrate 300, a touch sensing layer 400, a polarization layer 310, a resin layer 320, and a window 900.

In addition, the OLED display 2000 includes a display flexible printed circuit board 600 attached to the display panel 100 and a touch flexible printed circuit board 700 attached to the encapsulation substrate 300. The display flexible printed circuit board 600 applies signals for driving the display panel 100 and the touch flexible printed circuit board 700 applies touch input signals to the touch sensing layer 400.

When viewed from a top plane view, the OLED display 2000 includes a display area DA where images are displayed and a peripheral area PA surrounding the display area DA.

The display panel 100 includes a display substrate 110 formed of an insulating material such as transparent glass or plastic and a thin film display layer 200 formed on the display substrate 110.

The encapsulation substrate 300, the touch sensing layer 400, the polarization layer 310, the resin layer 320, and the window 900 are sequentially arranged on the thin film display layer 200. The thin film display layer 200, the encapsulation substrate 300, the touch sensing layer 400, the polarization layer 310, the resin layer 320, and the window 900 are the same as those of the OLED display of FIG. 1, and therefore, no further description thereof will be provided in this text.

A display driver 500 that applies a driving signal to each pixel of the thin film display layer 200 and a touch sensor pattern 810 are formed in the peripheral area PA on the display substrate 110.

A touch sensor 800 is formed on the touch sensor pattern 810. The touch sensor pattern 810 includes a lighting pattern formed of a light source such as a light emitting diode (LED). The touch sensor 800 includes a light source such as an LED.

The display flexible printed circuit board 600 includes a display terminal 610, an input section 620, and a touch connection portion 650.

The display terminal 610 is attached to the display substrate 110 and thus electrically connects the display flexible printed circuit board 600 to the display driver 500. The input section 620 receives an external signal.

The touch connection portion 650 is electrically connected to the touch sensor pattern 810 and thus transmits a touch input signal to the touch sensor 800 and/or transmits a touch output signal from the touch sensor 800 to an external device.

In addition, various circuit elements can be formed on the display flexible printed circuit board 600. The display flexible printed circuit board 600 receives a signal from an external source via the input section 620 and applies the received signal to the display driver 500.

The touch flexible printed circuit board 700 includes a touch terminal 710 and a second connection portion 720.

The touch terminal 710 is attached to the encapsulation substrate 300 and thus electrically connects the touch flexible printed circuit board 700 to the touch sensing layer 400. The second connection portion 720 electrically connects the touch flexible printed circuit board 700 to the display flexible printed circuit board 600. The touch flexible printed circuit board 700 is electrically connected to the display flexible printed circuit board 600 via the second connection portion 720 and receives an external signal input through the input section 620.

A touch driver 550 is mounted to the touch flexible printed circuit board 700. The touch driver 550 receives a sense input signal from the external source and transmits the received signal to the touch sensing layer 400. In addition, the touch driver 550 receives a sense output signal from the touch sensing layer 400 and processes the received signal.

In the embodiment of FIGS. 3 and 4, the display and touch flexible printed circuit boards 600 and 700 are respectively attached to the display substrate 110 and the encapsulation substrate 300 on opposing sides of the OLED display 2000, but this is not restrictive. The display and touch flexible printed circuit boards 600 and 700 can be connected on the same side of the OLED display 2000.

The display and touch flexible printed circuit boards 600 and 700 are each bent around an edge the display substrate 110 and are thus attached to the bottom surface of the display substrate 110.

The window 900 is attached to the polarization layer 310 via the resin layer 320. The resin layer 320 is cured by irradiating ultraviolet light onto the resin layer 320 and the resin layer 320 can be uniformly cured when the irradiation is sufficiently uniformly irradiated, and accordingly the window 900 can be firmly attached.

In the embodiment of FIGS. 3 and 4, the touch sensor 800 including the light source is formed in the peripheral area PA on the display substrate 110 so that an area A is available as an irradiation path such that the ultraviolet light can be uniformly irradiated. Accordingly, the resin layer 320 can be uniformly cured and the window 900 can be firmly attached.

In addition, since the touch sensor 800 is formed on the display substrate 110 and is electrically connected to the touch pad 640 of the display flexible printed circuit board 600, an additional flexible printed circuit board for the touch sensor 800 is not required.

Further, the touch sensor 800 is not formed on the window 900 and thus the size of the window 900 can be reduced compared to the standard OLED display.

The touch sensing layer will now be described in detail with reference to FIG. 5 to FIG. 7.

Figure 5:
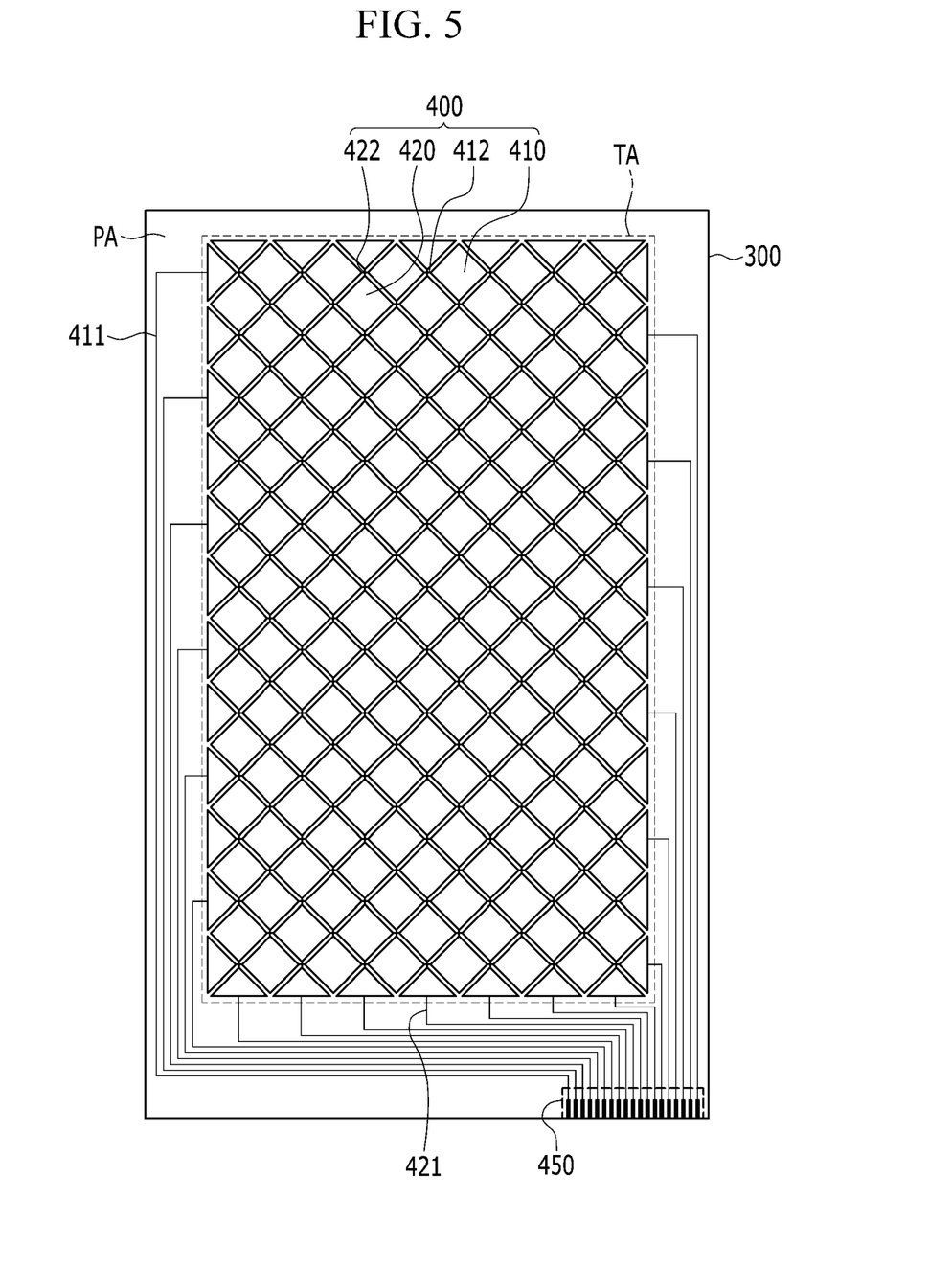
FIG. 5 is a top plan view illustrating a touch sensing layer of the OLED displays of FIG. 1 and FIG. 3.

Referring to FIG. 5, the touch sensing layer 400 is formed on the encapsulation substrate 300. The touch sensing layer 400 is formed in a touch active area TA where touch input can be sensed. The touch active area TA may be the entire display area DA or may include a portion of the peripheral area PA. Alternatively, only a portion of the display area DA may be the touch active area TA.

The touch sensing layer 400 can sense touch input via various different methods. Examples of the methods include resistive, capacitive, electro-magnetic (EM), and optical touch input methods.

A capacitive touch sensing layer 400 will be described as an exemplary embodiment.

The touch sensing layer 400 includes a plurality of touch electrodes and the touch electrodes include a plurality of first touch electrodes 410 and a plurality of second touch electrodes 420. The first and second touch electrodes 410 and 420 are separated from each other.

The first and second touch electrodes 410 and 420 are alternately arranged so as to not overlap each other in the touch active area TA. The first touch electrodes 410 may be arranged in a column direction and a row direction and the second touch electrodes 420 may also be arranged in a column direction and a row direction.

The first and second touch electrodes 410 and 420 may be formed on the same layer as each other or on different layers from each other, but this is not restrictive. Each of the first and second touch electrodes 410 and 420 may have a substantially quadrangular shape, but they are not limited thereto, and may have various forms such as a protrusion for improving the sensitivity of the touch sensing layer 400.

At least some of the first touch electrodes 410 arranged in the same row or column may be electrically connected to each other or separated from each other either inside or outside the touch active area TA. Likewise, at least some of the second touch electrodes 420 arranged in the same column or row may be electrically connected to each other or separated from each other either inside or outside the touch active area TA. For example, as illustrated in FIG. 5, the first touch electrodes 410 arranged in the same row are electrically connected to each other inside the touch active area TA and the second touch electrodes 420 arranged in the same column are electrically connected to each other inside the touch active area TA. In more detail, the first touch electrodes 410 arranged in each row are electrically connected to each other via a plurality of first connection portions 412 and the second touch electrodes 420 arranged in each column are electrically connected to each other via a plurality of second connection portions 422.

Figure 8:
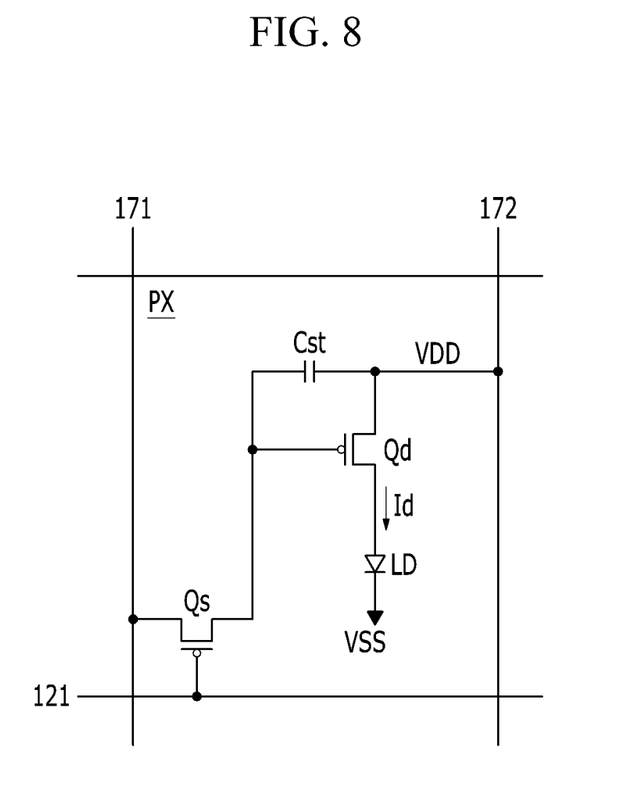
FIG. 8 is an equivalent circuit diagram of a pixel of the OLED display of FIG. 1 and FIG. 3.

The first touch electrodes 410 connected to each other in each row are electrically connected to the touch driver 500 via a plurality of first touch wires 411 and the second touch electrodes 420 connected to each other in each column are electrically connected to the touch driver 500 via a plurality of second touch wires 421. In some embodiments, the first and second touch wires 411 and 421 are formed in the peripheral area PA as shown in FIG. 8, however, in other embodiments, they are formed in the touch active area TA. End portions of the first and second touch wires 411 and 421 form a pad portion 450 in the peripheral area PA of the encapsulation substrate 300.

Here, the pad portion 450 are illustrated as being formed at a lower side surface of the encapsulation substrate 300 in FIG. 5, however, in the embodiment of FIG. 3, the pad portion 450 is formed on an upper side surface of the encapsulation substrate 300.

Figure 6:
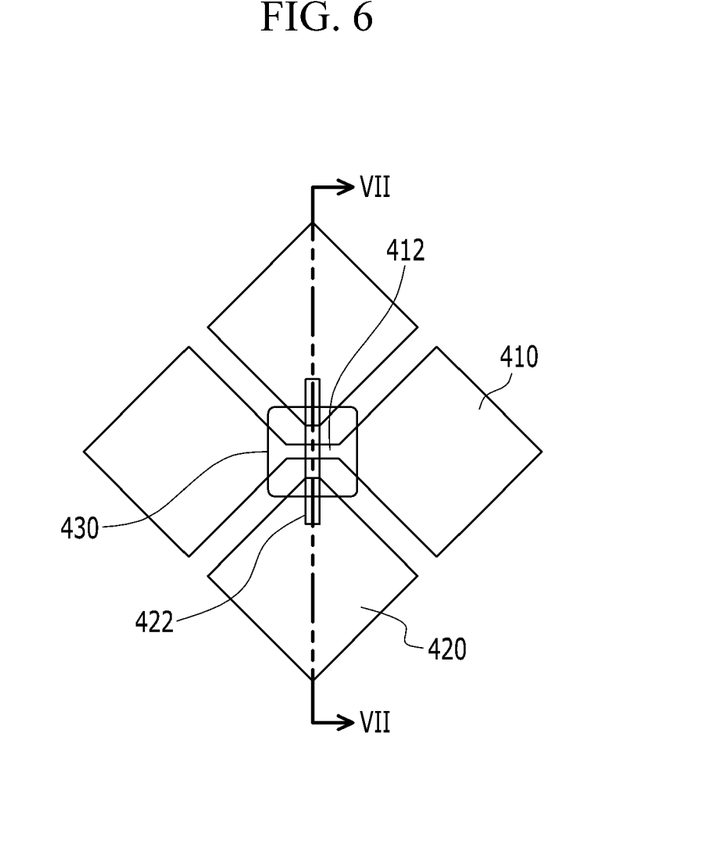
FIG. 6 is an enlarged view of a portion of the touch sensing layer of FIG. 5.
Figure 7:
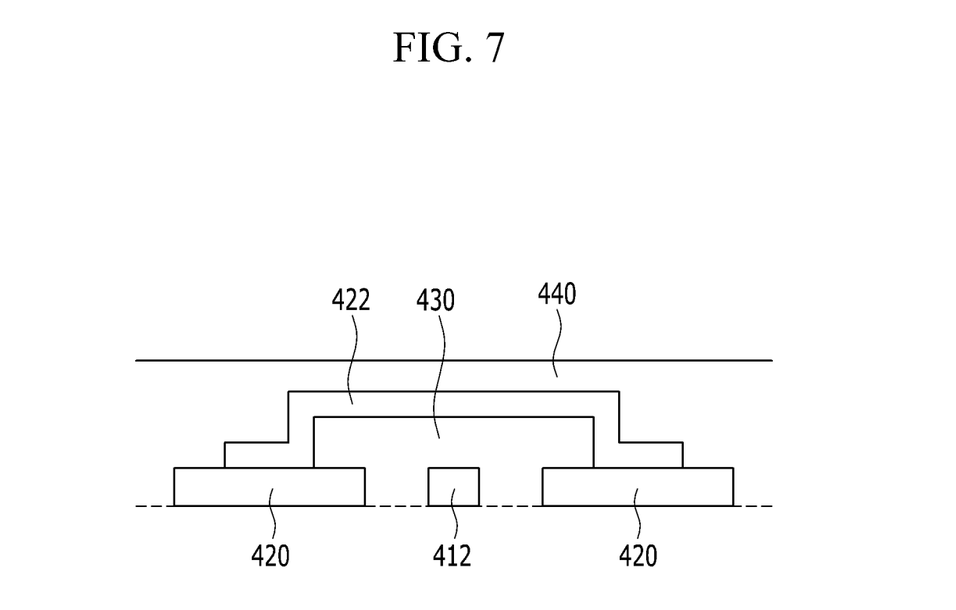
FIG. 7 is a cross-sectional view of FIG. 6, taken along the line VII-VII.

Referring to FIGS. 6 and 7, the first connection portions 412 connecting the first touch electrodes 410 adjacent to each other are formed on the same layer as the first touch electrodes 410 and are formed of the same material as the first touch electrodes 410. That is, in some embodiments, the first touch electrodes 410 and the first connection portions 412 are integrated and simultaneously patterned.

The second connection portions 422 connecting the second touch electrodes 420 adjacent to each other are formed on a different layer from the second touch electrodes 420. That is, the second touch electrodes 420 and the first connection portions 412 are separated from each other and separately patterned. The second touch electrodes 420 and the second connection portions 422 are electrically connected to each other through direct contact.

A first insulating layer 430 is interposed between the first and second connection portions 412 and 422 to electrically insulate them from each other. The first insulating layer 430 may be formed as a plurality of independent island-shaped insulators formed at the intersections between the first and second connection portions 412 and 422. The first insulating layer 430 exposes at least a portion of the second touch electrodes 420 so that the second connection portions 422 are electrically connected to the second touch electrodes 420. The first insulating layer 430 may have rounded corners and may be formed of SiOx, SiNx, and/or SiOxNy.

A second insulating layer 440 is formed on the first and second touch electrodes 410 and 420 and the second connection portions 422. The second insulating layer 440 is formed throughout the touch active area TA and may be formed of SiOx, SiNx, and/or SiOxNy.

In some embodiments, in contrast to the embodiment of FIG. 5, the second connection portions 422 electrically connecting the second touch electrodes 420 adjacent to each other can be formed on the same layer as the first touch electrodes 410 and integrated with the first touch electrodes 410. In these embodiments, the first connection portions 412 electrically connecting the first touch electrodes 410 adjacent to each other are formed on a different layer from the first touch electrodes 410.

The first and second touch electrodes 410 and 420 have a predetermined transmittance or greater so that light from the thin film display layer 200 can be transmitted therethrough. For example, the first and second touch electrodes 410 and 420 may be formed of a transparent conductive material, such as indium tin oxide (ITO), indium zinc oxide (IZO), a thin metal layer such as a silver nanowire (AgNW), a metal mesh, or carbon nanotubes (CNT), but are not limited thereto. The materials of the first and second connection portions 412 and 422 are the same as the materials of the touch electrodes.

The first and second touch wires 411 and 421 may include a transparent conductive material such as that forming the first and second touch electrodes 410 and 420 or a low resistive material such as molybdenum (Mo), silver (Ag), titanium (Ti), copper (Cu), aluminum (Al), or molybdenum/aluminum/molybdenum (Mo/Al/Mo).

The first and second touch electrodes 410 and 420 that are adjacent to each other form a mutual sensing capacitor functioning as a touch sensor for the touch sensing layer 400. The mutual sensing capacitor receives a sensing input signal through one of the first and second touch electrodes 410 and 420 and outputs a change in stored charge due to the contact of an external object through the other touch electrode as the sensing output signal.

In other embodiments, the each of first touch electrodes 410 and the second touch electrodes 420 are separated from each other and are electrically connected to a touch sensor controller through each touch wire (not illustrated). In these embodiments, each touch electrode forms a self-sensing capacitor as the touch sensor of the touch sensing layer 400. The self-sensing capacitor receives the sensing input signal to be charged to a predetermined charge amount and outputs a sensing output signal that is different from the sensing input signal due to a change in the stored charged generated when the external object such as a finger contacts the touch sensing layer 400 or window 900.

The thin film display layer according to an exemplary embodiment will now be described in detail with reference to FIG. 8 to FIG. 10. As previously described, the thin film display layer 200 includes a plurality of pixels.

FIG. 8 is an equivalent circuit diagram of one pixel of the OLED display of FIG. 1 and FIG. 3.

Referring to FIG. 8, the OLED display includes a plurality of signal lines 121, 171, and 172 and a plurality of pixels PX respectively connected to the signal lines and substantially arranged in a matrix.

The signal lines include a plurality of gate lines 121 transmitting gate signals (or scan signals), a plurality of data lines 171 transmitting data signals, and a plurality of driving voltage lines 172 transmitting a driving voltage ELVDD. The gate and data signals are received through the display driver 500.

The gate lines 121 extend in a row direction and are substantially parallel to each other and the data lines 171 and the driving voltage lines 172 extend in a column direction and are substantially parallel to each other.

Each pixel PX includes a switching thin film transistor Qs, a driving thin film transistor Qd, a storage capacitor Cst, and an OLED LD.

The switching thin film transistor Qs includes a control terminal, an input terminal, and an output terminal. The control terminal is electrically connected to the gate line 121, the input terminal is electrically connected to the data line 171, and the output terminal is electrically connected to the driving thin film transistor Qd. The switching thin film transistor Qs transmits a data signal received from the data line 171 to the driving thin film transistor Qd in response to a gate signal received from the gate line 121.

The driving thin film transistor Qd includes a control terminal, an input terminal, and an output terminal. The control terminal is electrically connected to the switching thin film transistor T1, the input terminal is electrically connected to the driving voltage line 172, and the output terminal is electrically connected to the OLED LD. The driving thin film transistor Qd outputs an output current Id having a magnitude that varies according to a voltage applied between the control terminal and the output terminal of the driving thin film transistor Qd.

The storage capacitor Cst is electrically connected between the control terminal and the input terminal of the driving thin film transistor Qd. The storage capacitor Cst is charged with a data signal applied to the control terminal of the driving thin film transistor Qd and maintains the data signal charge after the switching thin film transistor Qs is turned off.

The OLED LD includes an anode electrically connected to the output terminal of the driving thin film transistor Qd and a cathode electrically connected to a common voltage VSS. The OLED LD emits light with an intensity that varies according to the output current Id of the driving this film transistor Qd in order to display an image.

The switching thin film transistor Qs and the driving thin film transistor Qd may be n-channel electric field effect transistors (FETs) or p-channel electric field effect transistors. In addition, the connection relationship between the switching and driving thin film transistors Qs and Qd, the storage capacitor Cst, and the OLED LD can be changed according to the design requirements of the OLED display.

Figure 9:
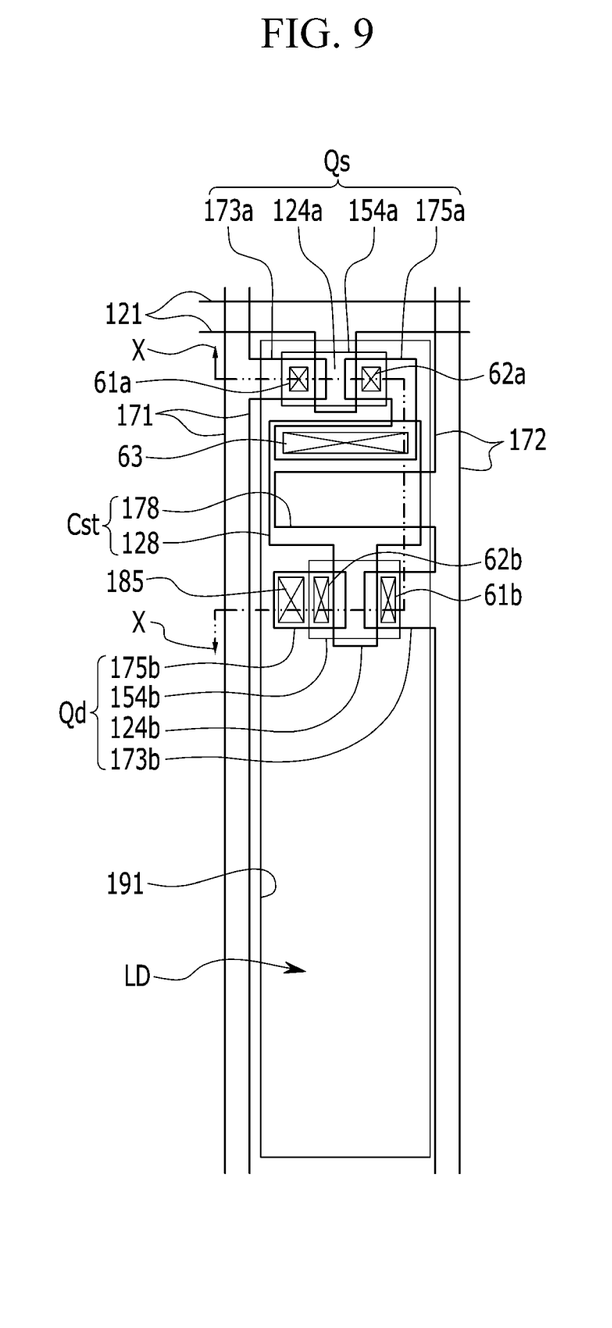
FIG. 9 is a layout view of one pixel of the OLED displays of FIG. 1 and FIG. 3.

FIG. 9 is a layout view of one pixel of the OLED displays of FIG. 1 and FIG. 3. FIG. 10 is a cross-sectional view of FIG. 9, taken along the line X-X.

Figure 10:
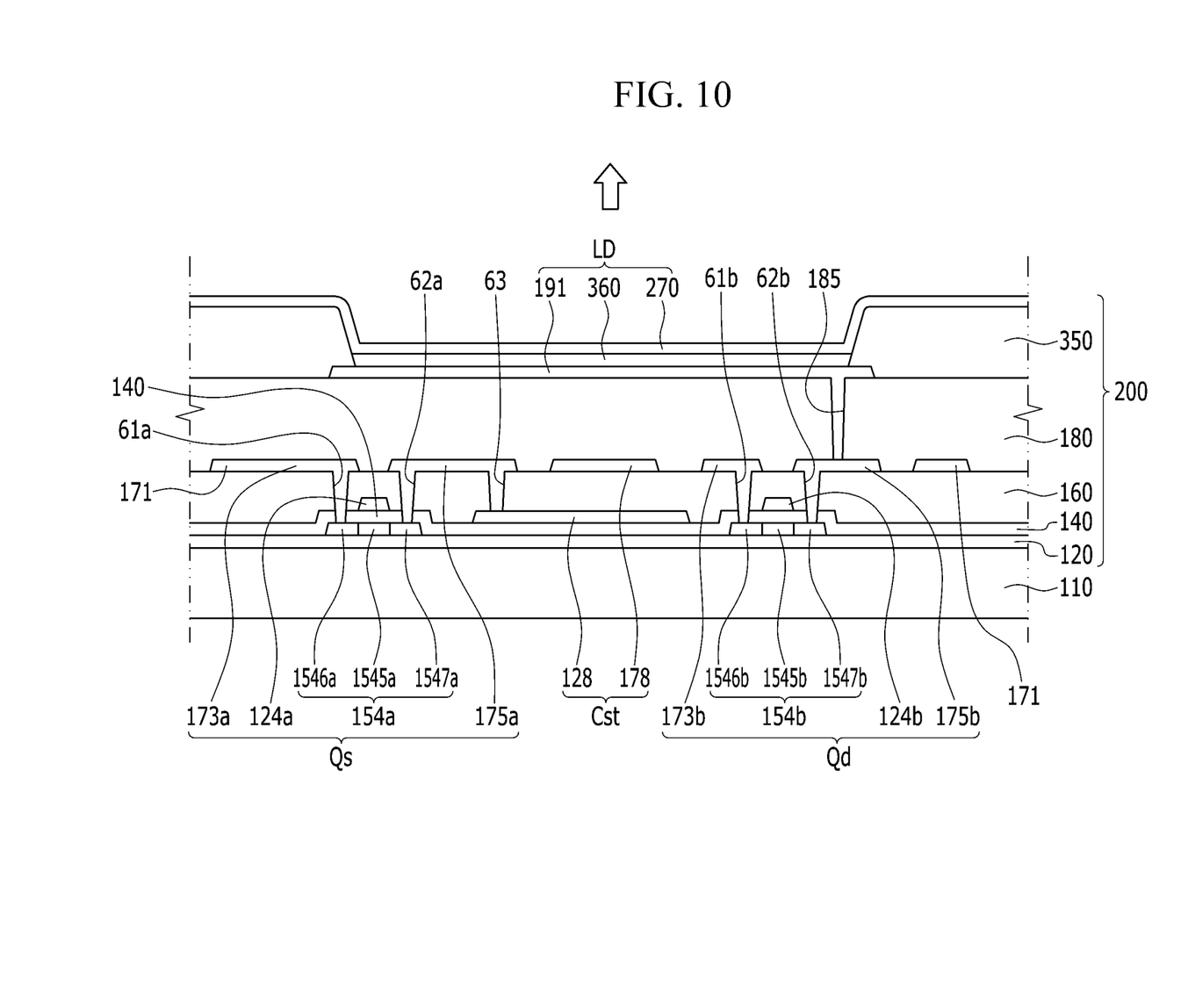
FIG. 10 is a cross-sectional view of FIG. 9, taken along the line X-X.

Referring to FIG. 9 and FIG. 10, the thin film display layer 200 is formed on the display substrate 110 in the OLED display of FIG. 1 and FIG. 3.

The thin film display layer 200 includes a buffer layer 120, a switching semiconductor 154a, a driving semiconductor layer 154b, a gate insulating layer 140, gate lines 121, a first storage capacitor plate 128, an interlayer insulating layer 160, data lines 171, driving voltage lines 172, a switching drain electrode 175a, a driving drain electrode 175b, and a passivation layer 180.

The buffer layer 120 is formed on the display substrate 110 and may be formed as a single layer of a silicon nitride (SiNx) or as a double-layered structure in which a silicon nitride (SiNx) and a silicon oxide (SiOx) are laminated. The buffer layer 120 planarizes a surface of the display substrate 110 and substantially prevents contaminants such as impurities or moisture from permeating.

The switching and driving semiconductor layers 154a and 154b are formed at a distance from each other on the buffer layer 120. The switching and driving semiconductor layers 154a and 154b are formed of polysilicon and include channel regions 1545a and 1545b, source regions 1546a and 1546b, and drain regions 1547a and 1547b. The source regions 1546a and 1546b and the drain regions 1547a and 1547b are respectively formed on opposing sides of the channel regions 1545a and 1545b.

The channel regions 1545a and 1545b are formed of polysilicon which is not doped with impurities, that is, intrinsic semiconductors, and the source regions 1546a and 1546b and the drain regions 1547a and 1547b are formed of polysilicon which is doped with impurities, that is, doped semiconductors.

The gate insulating layer 140 is formed on the channel regions 1545a and 1545b of the switching and driving semiconductor layers 154a and 154b. The gate insulating layer 140 may be a single layer or a multilayer including one or more of a silicon nitride and a silicon oxide.

The gate lines 121 and the first storage capacitor plate 128 are formed on the gate insulating layer 140.

The gate line 121 extends in a horizontal direction, transmits a gate signal, and includes a switching gate electrode 124a protruding toward the switching semiconductor layer 154a from the gate line 121.

The first storage capacitor plate 128 includes a driving gate electrode 124b protruding toward the driving semiconductor layer 154b from the first storage capacitor plate 128.

The switching gate electrode 124a and the driving gate electrode 124b respectively overlap the channel regions 1545a and 1545b.

The interlayer insulating layer 160 is formed on the gate lines 121, the first storage capacitor plate 128, and the gate insulating layer 140.

A switching source contact hole 61a and a switching drain contact hole 62a that respectively expose the source region 1546a and the drain area 1547a of the switching semiconductor layer 154a are formed in the interlayer insulating layer 160. In addition, a driving source contact hole 61b and a driving drain contact hole 62b that respectively expose the source region 1546b and the drain region 1547b of the driving semiconductor layer 154b are formed in the interlayer insulating layer 160.

The data lines 171, the driving voltage lines 172, the switching drain electrode 175a, and the driving drain electrode 175b are formed on the interlayer insulating layer 160.

The data line 171 transmits a data signal, extends in a direction crossing the gate lines 121, and includes a switching source electrode 173a protruding toward the semiconductor 154a from the data line 171.

The driving voltage lines 172 transmit a driving voltage, are separated from the data lines 171, and extend in the same direction as the data lines 171. The driving voltage line 172 includes a driving source electrode 173b protruding toward the driving semiconductor layer 154b from the driving voltage line 172 and a second storage capacitor plate 178 protruding from the driving voltage line 172 and overlapping the first storage capacitor plate 128. Here, the first storage capacitor plate 128 and the second storage capacitor plate 178 form the storage capacitor Cst using the interlayer insulating layer 160 as a dielectric material.

The switching drain electrode 175a faces the switching source electrode 173a and the driving drain electrode 175b faces the driving source electrode 173b.

The switching source electrode 173a and the switching drain electrode 175a are respectively connected with the source region 1546a and the drain region 1547a of the switching semiconductor layer 154a through the switching source contact hole 61a and the switching drain contact hole 62a. In addition, the switching drain electrode 175a extends toward and is thus electrically connected to the first storage capacitor plate 128 and the driving gate electrode 124b through a first contact hole 63 formed in the interlayer insulating layer 160.

The driving source electrode 173b and the driving drain electrode 175b are respectively connected to the source region 1546b and the drain region 1547b of the driving semiconductor layer 154b through the driving source contact hole 61b and the driving drain contact hole 62b.

The switching semiconductor layer 154a, the switching gate electrode 124a, the switching source electrode 173a, and the switching drain electrode 175a form the switching thin film transistor Qs. Similarly, the driving semiconductor layer 154b, the driving gate electrode 124b, the driving source electrode 173b, and the driving drain electrode 175b form the driving thin film transistor Qd.

The passivation layer 180 is formed on the data lines 171, the driving voltage lines 172, the switching drain electrode 175a, and the driving drain electrode 175b.

A second contact hole 185 exposing the driving drain electrode 175b is formed in the passivation layer 180.

The OLED LD and a pixel defining layer 350 are formed on the passivation layer 180.

The OLED LD includes a pixel electrode 191, an organic emission layer 360, and a common electrode 270.

The pixel electrode 191 is formed on the passivation layer 180 and is electrically connected to the driving drain electrode 175b of the driving thin film transistor Qd through the second contact hole 185 formed in the interlayer insulating layer 160. The pixel electrode 191 is the anode of the OLED LD.

The pixel electrode 191 may be formed of a transparent conductive material such as indium tin oxide (ITO), indium zinc oxide (IZO), zinc oxide (ZnO), or indium oxide (In2O3), or a reflective metal such as lithium (Li), calcium (Ca), lithium fluoride/calcium (LiF/Ca), lithium fluoride/aluminum (LiF/Al), aluminum (Al), silver (Ag), magnesium (Mg), or gold (Au).

The pixel defining layer 350 is formed on an edge portion of the pixel electrode 191 and on the passivation layer 180. The pixel defining layer 350 includes an opening exposing the pixel electrode 191. The pixel defining layer 350 may be formed of a resin such as a polyacrylate or a polyimide.

The organic emission layer 360 is formed on the pixel electrode 191 in the opening of the pixel defining layer 350. The organic emission layer 360 is formed of multilayers including one or more of a light emitting layer, a hole injection layer (HIL), a hole transporting layer (HTL), an electron transporting layer (ETL), and an electron injection layer (EIL). When the organic emission layer 360 includes all the layers, the hole injection layer (HIL) is formed on a pixel electrode which is an anode, and the hole transporting layer (HTL), the light emitting layer, the electron transporting layer (ETL), and the electron injection layer (EIL) are sequentially laminated thereon.

The organic emission layer 360 may include a red, green, or blue organic emission layer respectively emitting red, green, or blue light. The red, green, and blue organic emission layers are respectively formed in red, green, and blue pixels, thereby implementing a color image.

Further, the organic emission layer 360 may implement the color image by laminating the red, green, and blue organic emission layers together in each of the red, green, and blue pixels, and forming one of red, green, and blue color filters for each pixel. As another example, white organic emission layers emitting white light may be formed in each of the red, green, and blue pixels, and red, green, and blue color filters may be formed for each pixel, thereby implementing the color image. When implementing the color image by using the white organic emission layer and the color filters, a deposition mask for depositing the red, green, and blue organic emission layers, on the respective pixels, that is, the red, green, and blue pixels, is not required.

The white organic emission layer described in another example may be formed by one organic emission layer or can be formed with a configuration so as to emit white light by laminating a plurality of organic emission layers. For example, the white organic emission layer may include a configuration which may emit white light by combining at least one yellow organic emission layer and at least one blue organic emission layer, a configuration which may emit white light by combining at least one cyan organic emission layer and at least one red organic emission layer, a configuration which may emit white light by combining at least one magenta organic emission layer and at least one green organic emission layer, or the like.

The common electrode 270 is formed on the pixel defining layer 350 and the organic emission layer 360. The common electrode 270 may be formed of a transparent conductive material such as ITO, IZO, ZnO, or $In_2O_3$, or a reflective metal such as lithium (Li), calcium (Ca), lithium fluoride/calcium (LiF/Ca), lithium fluoride/aluminum (LiF/Al), aluminum (Al), silver (Ag), magnesium (Mg), or gold (Au). The common electrode 270 is the cathode of the OLED LD.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organic light-emitting diode (OLED) display, comprising:
   a display substrate including a display area and a peripheral area surrounding the display area;
   a thin film display layer disposed in the display area and configured to display images;
   a touch sensor disposed in the peripheral area on the display substrate, wherein the touch sensor is not disposed in the display area and is configured to change the images in the display area;
   an encapsulation substrate disposed over the thin film display layer;
   a touch sensing layer disposed in the display area and over the encapsulation substrate, wherein the touch sensing layer is separate from the touch sensor;
   a touch flexible printed circuit board electrically connected to the touch sensing layer and attached to the encapsulation layer;
   a touch driver disposed over the touch flexible printed circuit board and configured to receive a sense output signal from the touch sensing layer;
   a display flexible printed circuit board electrically connected to the thin film display layer and attached to the display substrate; and
   a window disposed over the touch sensing layer,
   wherein the touch sensor only partially overlaps the display flexible printed circuit board in the depth dimension of the OLED display.

2. The OLED display of claim 1, wherein the display flexible printed circuit board comprises a touch pad electrically connected to the touch sensor.

3. The OLED display of claim 2, wherein the touch pad is configured to apply a touch input signal to the touch sensor or receive a touch output signal from the touch sensor.

4. The OLED display of claim 1, further comprising a touch sensor pattern interposed between the touch sensor and the display substrate.

5. The OLED display of claim 4, wherein the display flexible printed circuit board comprises a touch connection portion electrically connected to the touch sensor pattern.

6. The OLED display of claim 5, wherein the touch connection portion is configured to i) apply a touch input signal to the touch sensor via the touch sensor pattern or ii) receive a touch output signal from the touch sensor via the touch sensor pattern.

7. The OLED display of claim 1, wherein the display flexible printed circuit board and the touch flexible printed circuit board are arranged on the same side of the display substrate.

8. The OLED display of claim 1, wherein the display flexible printed circuit board and the touch flexible printed circuit board are arranged on opposing sides of the display substrate.

9. The OLED display of claim 1, wherein the thin film display layer comprises a plurality of pixels and wherein each pixel comprises an OLED.

10. The OLED display of claim 1, further comprising a resin layer interposed between the touch sensing layer and the window.

11. The OLED display of claim 1, wherein the touch sensor comprises a light source.

12. The OLED display of claim 11, wherein the light source is a light emitting diode (LED).

13. An organic light-emitting diode (OLED) display, comprising:
- a substrate including a display area and a peripheral area surrounding the display area;
- a thin film display layer disposed in the display area;
- an encapsulation substrate disposed over the thin film display layer;
- a touch sensing layer disposed in the display area and over the encapsulation substrate, wherein the touch sensing layer is separate from the touch sensor;
- a touch sensor disposed in the peripheral area, wherein the touch sensor is not disposed in the display area and is configured to sense a touch input and change images in the display area, and wherein the touch sensor directly contacts the substrate;
- a touch flexible printed circuit board electrically connected to the touch sensing layer and attached to the encapsulation layer;
- a touch driver disposed over the touch flexible printed circuit board and configured to receive a sense output signal from the touch sensing layer;
- a window disposed over the touch sensor,
- wherein a gap is disposed between the window and the touch sensor.

14. The OLED display of claim 13, further comprising:
- a display flexible printed circuit board electrically connected to the thin film display layer and the touch sensor.

15. The OLED display of claim 14, wherein the display flexible printed circuit board includes an input unit and is configured to transmit i) display signals received from the input unit to the thin film display layer and ii) touch input signals received from the input unit to the touch sensor.

16. The OLED display of claim 15, wherein the touch flexible printed circuit board is electrically connected to the display flexible printed circuit board and is configured to transmit sense input signals received from the display flexible printed circuit board to the touch sensing layer.

17. The OLED display of claim 14, wherein the touch and display flexible printed circuit boards are spaced apart from the window.

18. The OLED display of claim 14, further comprising a touch sensor pattern interposed between the touch sensor and the display substrate.

* * * * *